US011802689B2

(12) United States Patent
Hiat (10) Patent No.: US 11,802,689 B2
(45) Date of Patent: Oct. 31, 2023

(54) COMMISSIONING POWER PLANTS (71) Applicant: Boyle Energy Services & Technology, Inc., Merrimack, NH (US)

(72) Inventor: Judah Hiat, Merrimack, NH (US)

(73) Assignee: Boyle Energy Services & Technology, Inc., Merrimack, NH (US)

( * ) Notice: Subject to any disclaimer, the term of this patent is extended or adjusted under 35 U.S.C. 154(b) by 401 days.

(21) Appl. No.: 16/623,570

(22) PCT Filed: Jun. 19, 2018

(86) PCT No.: PCT/US2018/038313
§ 371 (c)(1),
(2) Date: Dec. 17, 2019

(87) PCT Pub. No.: WO2018/236891
PCT Pub. Date: Dec. 27, 2018

(65) Prior Publication Data
US 2020/0173651 A1    Jun. 4, 2020

Related U.S. Application Data

(60) Provisional application No. 62/522,202, filed on Jun. 20, 2017.

(51) Int. Cl.
| F22B 37/48 | (2006.01) |
| F01K 23/10 | (2006.01) |
| F22B 37/54 | (2006.01) |
| F22B 37/56 | (2006.01) |
| F24H 9/00 | (2022.01) |
| F28G 9/00 | (2006.01) |

(52) U.S. Cl.
CPC .......... *F22B 37/486* (2013.01); *F22B 37/483* (2013.01); *F01K 23/10* (2013.01); *F22B 37/54* (2013.01); *F22B 37/56* (2013.01); *F24H 9/0042* (2013.01); *F28G 9/00* (2013.01)

(58) Field of Classification Search
None
See application file for complete search history.

(56) References Cited

U.S. PATENT DOCUMENTS 6,588,198 B2   7/2003  Stats
7,861,532 B2   1/2011  Law et al.
(Continued)

FOREIGN PATENT DOCUMENTS

| DE | 19648642 A1 * | 5/1998 | ........... F01K 23/106 |
| JP | H0979504 A *  | 3/1997 | ........... F01K 23/106 |

(Continued)

OTHER PUBLICATIONS

English translation of JP-3614949-B2 (Year: 2005).*
(Continued)

*Primary Examiner* — Steven S Anderson, II
*Assistant Examiner* — Kurt J Wolford
(74) *Attorney, Agent, or Firm* — Burns & Levinson LLP; Jerry Cohen; Joseph P. Quinn (57) ABSTRACT

Improved steamblow commissioning of a steam plant with steam discharged to the condenser and increased use of permanent piping instead of temporary piping with quenching/desuperheating and providing a low back pressure environment to enable aggressive steam blow cleaning.

10 Claims, 10 Drawing Sheets

(56) References Cited

U.S. PATENT DOCUMENTS

| | | | | |
|---|---|---|---|---|
| 9,217,566 B2* | 12/2015 | Bloch | ................. | B08B 3/02 |
| 10,480,780 B2* | 11/2019 | Bloch | ................. | F26B 5/04 |
| 10,627,104 B2* | 4/2020 | Bloch | ................. | F16L 57/06 |
| 10,782,015 B2* | 9/2020 | Bloch | ................. | F16L 57/06 |
| 2008/0236616 A1* | 10/2008 | Bloch | ................. | F22B 37/486 |
| | | | | 134/182 |
| 2010/0242430 A1 | 9/2010 | Hu et al. | | |
| 2014/0238507 A1* | 8/2014 | Bloch | ................. | F26B 5/04 |
| | | | | 137/377 |

FOREIGN PATENT DOCUMENTS

| | | | | |
|---|---|---|---|---|
| JP | 3614949 B2 * | 1/2005 | ............ | F01K 23/10 |
| WO | 2016067864 A1 | 5/2016 | | |

OTHER PUBLICATIONS

English translation of DE-19648642-A1 (Year: 1998).*
English translation of JP H0979504 A (Year: 1997).*
Engineering 360 (Year: 2005).*
Engineering 360 Access Date (Year: 2022).*
International Search Report and Written Opinion issued in PCT/US2018/038313 dated Sep. 12, 2018.

\* cited by examiner

COMMISSIONING POWER PLANTS

RELATED APPLICATION(S)

This application is a national phase application under 35 U.S.C. 371 of International Application No. PCT/US2018/038313, filed Jun. 19, 2018 which claims priority to Provisional Application No. 62/522,202, filed Jun. 20, 2017. The entire contents of which are incorporated herein by reference as though set out at length herein.

BACKGROUND

The present invention relates to the commissioning of new and refurbished steam generation plant equipment and piping.

The state of the art as of 2007-2008 is indicated in U.S. Pat. No. 9,217,566 issued Dec. 22, 2015 ('566 patent) of Christopher J. Bloch filed as Ser. No. 12/056,128 Mar. 26, 2008 with priority from provisional application 60/908,277 filed Mar. 26, 2007. It is assigned to the same assignee as the present assignee/applicant. The '566 patent's full contents are incorporated herein by reference as though fully stated herein. The invention(s) described in the '566 patent changed the pre-existing state of the art and led to a new method and apparatus provided to the art by its assignee, under its trademarks SIGMA™ and SIGMABLOW™, as a way of reducing time, labor, cost and external fuel and water resources costs of the power plant commissioning. The process improvement included features of integrating decontamination with other commissioning activities (e.g. tuning); removing both particulate and non-particulate contamination essentially at the same time; inclusion of all elements of the steam/condensate cycle in the commissioning; use of steam blow at high steam velocities to effect high cleaning force conditions and chemical treatment of non-particulate contaminants to enable removal. The '566 patent shows use of temporary equipment and piping to enable high temperature, high power operation of a stand-alone steam cycle or of combined cycles with steam cycle recovery and combined main cycle plant operating e.g. in combustion of petroleum base gases, methane or biofuel, or use of solar, nuclear or geothermal sources.

SUMMARY OF THE INVENTION

Since the advent of the process based on the '566 patent, needs and opportunities for further improvement remain. Major modifications are made through the present invention according to several aspects thereof.

The present invention fulfills a need and opportunity to reduce the extent and burdens of time and cost of introduction of temporary piping and equipment for commissioning. This reduction in temporary piping and equipment is accomplished by increasing the utilization of existing piping equipment. Steam is conveyed to the condenser by modifying the existing turbine bypass lines instead of building new temporary turbine bypasses. Temporary piping is rated for permanent pressures so the existing Pressure Safety Valves (PSVs) can be utilized instead of adding new temporary PSVs. There is utilization of new quenching equipment installed in the permanent piping to cool steam to accommodate carbon steel temporary piping and also to effect desuperheating to modify enthalpy to fit limits of the condenser in the steam power cycle. Some use of temporary components for commissioning is needed to enable a high flow rate needed in commissioning with reversion to permanent flow components (valves, piping) after commissioning, cleaning and transition to steady state operation. The temporary piping and equipment is optionally (but preferably) removed from the plant after commissioning. In any event after commissioning the permanent piping and equipment is fully enabled to run the closed cycle plant operation.

A low back pressure is established in the commissioning to enable aggressive cleaning conditions of the steamblow thereby avoiding or reducing need for or extent of usage, if any, of customary artifacts such as chemical cleaning, water flushing or hydrolazing.

Other objects, features and advantages will be apparent from the following detailed description of preferred embodiments taken in conjunction with the accompanying drawings in which:

While the embodiments of FIGS. 1 and 2, described below, are both shown as combined cycle plants with commissioning of the heat recovery steam plant adjunct, the steam plant commissioning method and apparatus are also usable for commissioning of stand-alone steam plants.

BRIEF DESCRIPTION OF THE DRAWINGS

FIG. 1 shows a schematic of a complete combined cycle plant apparatus per a first embodiment of the present invention incorporating the above described aspects of the present invention, while

FIG. 2 shows a schematic of a complete combined cycle plant apparatus per a second embodiment of the present invention incorporating the above described aspects of the present invention, while

DETAILED DESCRIPTION OF PREFERRED EMBODIMENTS

FIG. I with parts expanded in FIGS. IA-ID (components of the FIG. I schematic) show schematically a first preferred embodiment of the present invention. The steam plant to be commissioned itself can operate stand-alone or as a heat recovery supplementary portion of a combined power cycle with one or more primary power cycles based on other sources of energy (e.g. combustion gas, solar, geothermal or otherwise). In a combined cycle, the steam cycle "boiler" may be a heat recovery steam generator (HT RCV) reheating condensate to steam from primary cycle residual energy use of one of the above energy sources. Steam is admitted to the turbine to drive a load (e.g. an electricity generator). Exhaust steam from the turbine is admitted to a condenser COND, which may be of "surface cooled" form, i.e. with steam cooled on surfaces of pipes therein with circulation of liquid coolant therein or of air cooled condenser (ACC) types. The condenser has a condenser vapor space CVS therein (or in an adjunct condensate tank) and a hotwell therein containing liquid condensate that is recirculated to the boiler via one or more condensate pumps of permanent plant equipment recirculating condensate. In many steam plant systems there is a need for commissioning, for initial startups of plants or later startups after offline repairs, to deal with major particulate and nonparticulate contamination of plant piping and equipment introduction in original manufacturing or refurbishing of the plant.

Figure 1:
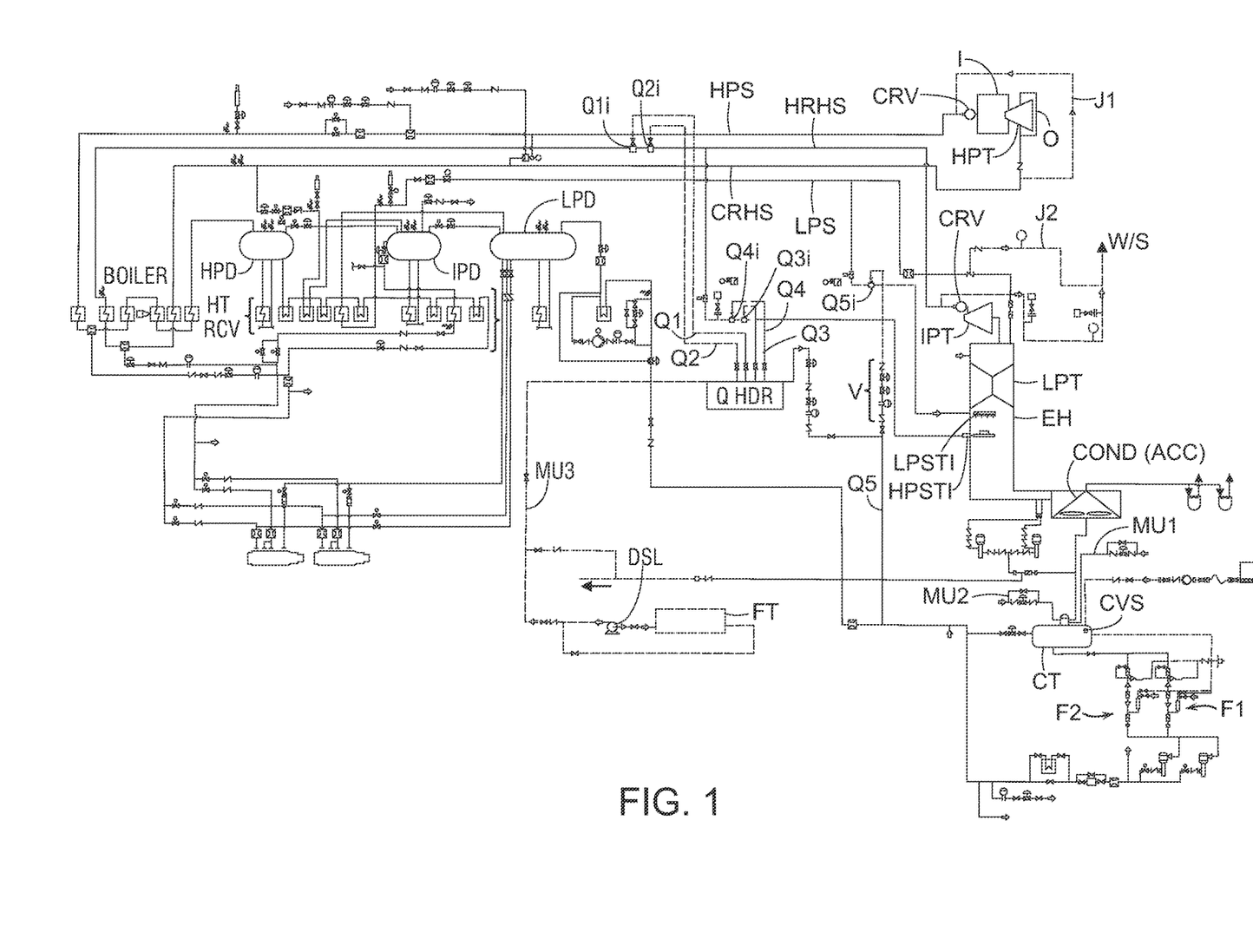
Figure 1A:
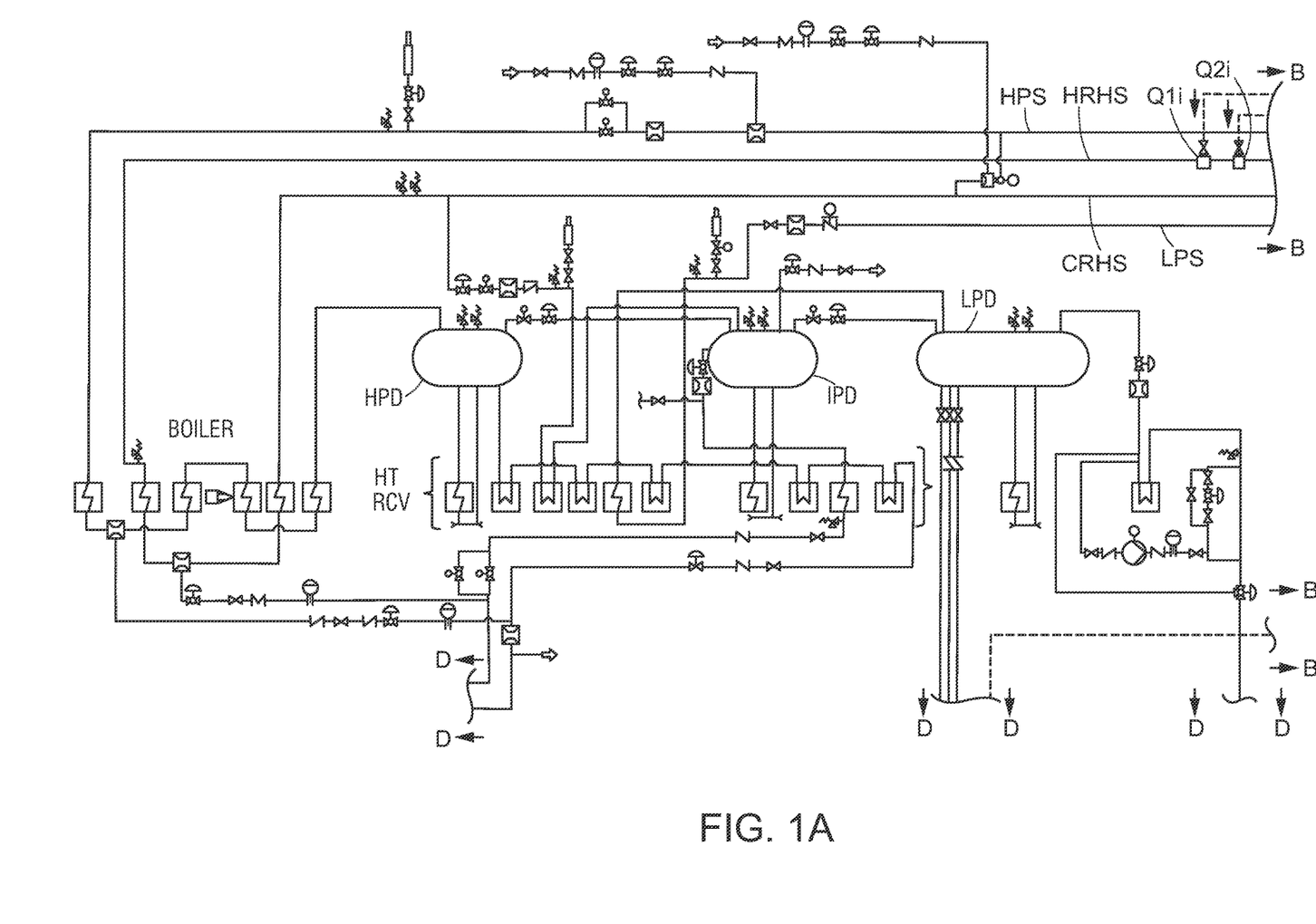
FIGS. 1A, 1B, 1C, and 1D show portions thereof in higher scale for ease of viewing and explanation. Connecting points of the FIGS. 1A, 1B, 1C and 1D are indicated by arrows A-A at breaks of other FIGS. connecting to FIG. 1A, B-B at breaks of other FIGS. connecting to FIG. 1B, C-C, at breaks of other FIGS connecting to FIG. 1C, and D-D at breaks of other FIGS connecting to FIG. 1D.

In FIGS. 1, IA, IB, IC, ID the steam plant, as a whole, is shown, as an exemplary embodiment, as including a primary boiler section with heat exchangers, heat recovery stack labeled (HT RCV) with further hear exchangers connected to a high pressure (HP) steam drum (HPD), an intermediate pressure (IP) steam drum (IPD) and low pressure (LP) steam drum (LPD) Steam lines are provided for high pressure steam (HPS), hot reheat steam (HRHS), low pressure steam (LPS) and cold reheat steam (CRHS) as shown in FIGS. 1, IA, IB. These lines are serviced by a quenching water header (Q-HDR) with outlet lines Q1, Q2, Q3, Q4 leading to quench injection points Q1i, Q2i, Q3i and Q4i at the above cited steam lines as shown in FIGS. 1, IA, IB. The steam powered engines of the plant comprise a high pressure turbine (HPT), with dual steam inlet lines I and dual outlet lines O and with a lead-in control valve an intermediate pressure turbine (IPT) with a lead-in control valve and a low pressure turbine (LPT), the latter with an exhaust hood (EH) including an intermediate pressure steam sparge tube injector and low pressure steam sparge tube injector (LPSTI), leading up to an air cooled condenser (COND (ACC)) shown in FIGS. 1, IC. The condenser has a main exhaust leading to a condensate tank CT with a condensate vapor space (CVS) therein. Vacuum pumps to establish low base pressure in the condenser, inlet feed and MU1 and MU2 for make-up water to the tank (MU1 continuously and MU2 intermittently on demand) and an exhaust to waste W/S engaged if and as needed and an outlet line Q5 for providing quenching water under valve(s) V control at location Q5i of a temporary line as described below.

Previous versions of the SIGMABLOW™ steamblow system described in the '566 patent utilized a temporary pipe line to convey steam to the condenser. The resultant sustained high volume flow in the temporary piping and size and expense of alloy steel portions of such temporary piping installation (compared to carbon steel piping throughout the permanent plant and other portions of the temporary piping) can be reduced by making greater use of permanent piping of the steam flow. Prior art, such as the Siemens ABO process, and some processes of General Electric Co. use the permanent bypass line to convey steam to the condenser. The limitation of these processes is that they leave the permanent bypass valve installed, with a sacrificial trim kit installed. The bypass valve body and trim kit create a significant flow restriction, which creates backpressure on the steam systems during the steamblow process. The effect of this increased pressure is to reduce steam velocities in the systems being cleaned, which results in a longer blow duration and lower quality cleaning of the systems. To compensate for the limited effectiveness of the steamblow in these methods, the prior art methods may require a substantial amount of expensive chemical cleaning, high velocity water flushes, and/or complete hydrolazing of the associated steam piping systems. In the present invention chemical cleaning can be omitted or applied in reduced form for reacting with non-particulate contamination during commissioning.

In order to take advantage of portions of the existing bypass piping without the above limitations, the present invention uses the existing bypass piping, but with some temporary modification.

(a) The permanent HRH steam and LP steam bypass valves are removed (or preferably not installed until after the completion of the steam plant commissioning). The bypass valves are provided with a temporary piping spool containing a gate valve (GV), (FIGS. 1, 1B) and temporary desuperheating system, for use in the commissioning and in all instances removed after commissioning and replaced by the permanent HRH and LP bypass valves and related spools.

(b) If necessary, the plant's permanent bypass diffusers, if any, are modified to facilitate the steamblow process. This becomes a factor in cases where the design of the diffuser(s) is not suitable to handle particulate contamination, for example diffusers with very small holes or a stacked plate style diffusers. See, the '566 Bloch patent for showing of diffusers, generally, per se, or combined with managing flow of turbine exhaust steam to the condenser, often via a cyclone separator. In many instances of use of the invention in commissioning projects the diffuser and/or cyclone separators (or the like) components can be eliminated with significant savings of costs and of time to set up and take down temporary commissioning components.

The flow area of an open full port gate valve is much greater than the equivalent flow area through the permanent bypass valve trim that is temporarily replaced by the gate valve for commissioning. This is because the permanent bypass valve is designed for flow control with a high differential pressure. In the HRH system this means reducing pressure from calibrated base pressure, e.g. 600 psi, to whatever the pressure upstream of the diffuser is, which is typically around 100 psi at load. So the valve is designed to reduce pressure by about 500 psi in a controlled fashion without acoustic vibration issues. The steamblow for commissioning requires flow control with minimum pressure drop, since the goal is to minimize backpressure on the system being cleaned. A gate valve or the like (GV) is provided for this purpose.

Because the steamblow per the '566 patent teachings can be performed with a low back pressure, it is possible to achieve extremely aggressive cleaning conditions in the boiler and piping systems. This means that customary-to-prior-art steps of hydrolazing, water flushing, and extensive chemical cleaning of the systems are not necessary or even beneficial in many instances. This makes this approach significantly faster and more economical than prior art technologies.

Figure 1B:
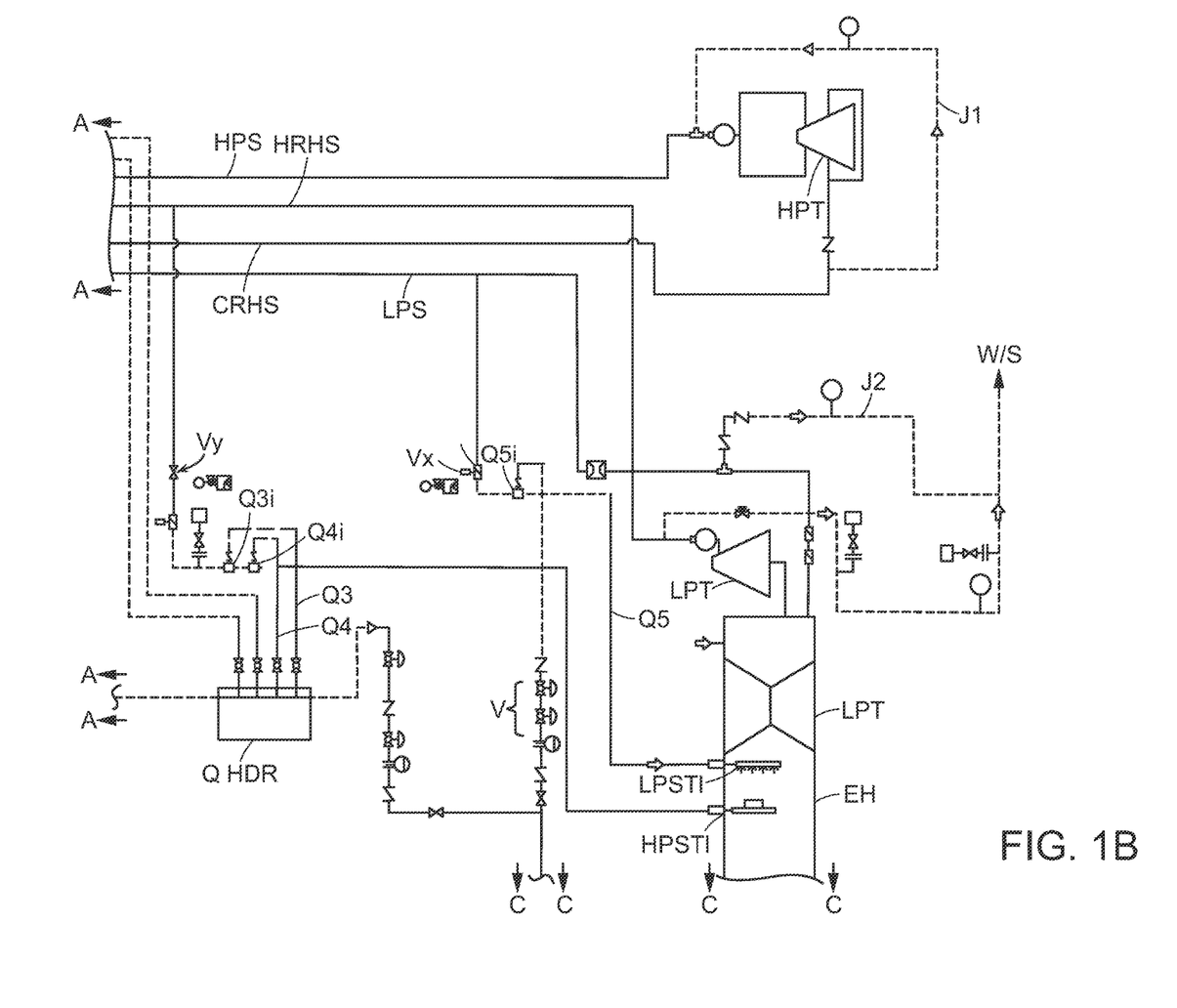
Figure 1C:
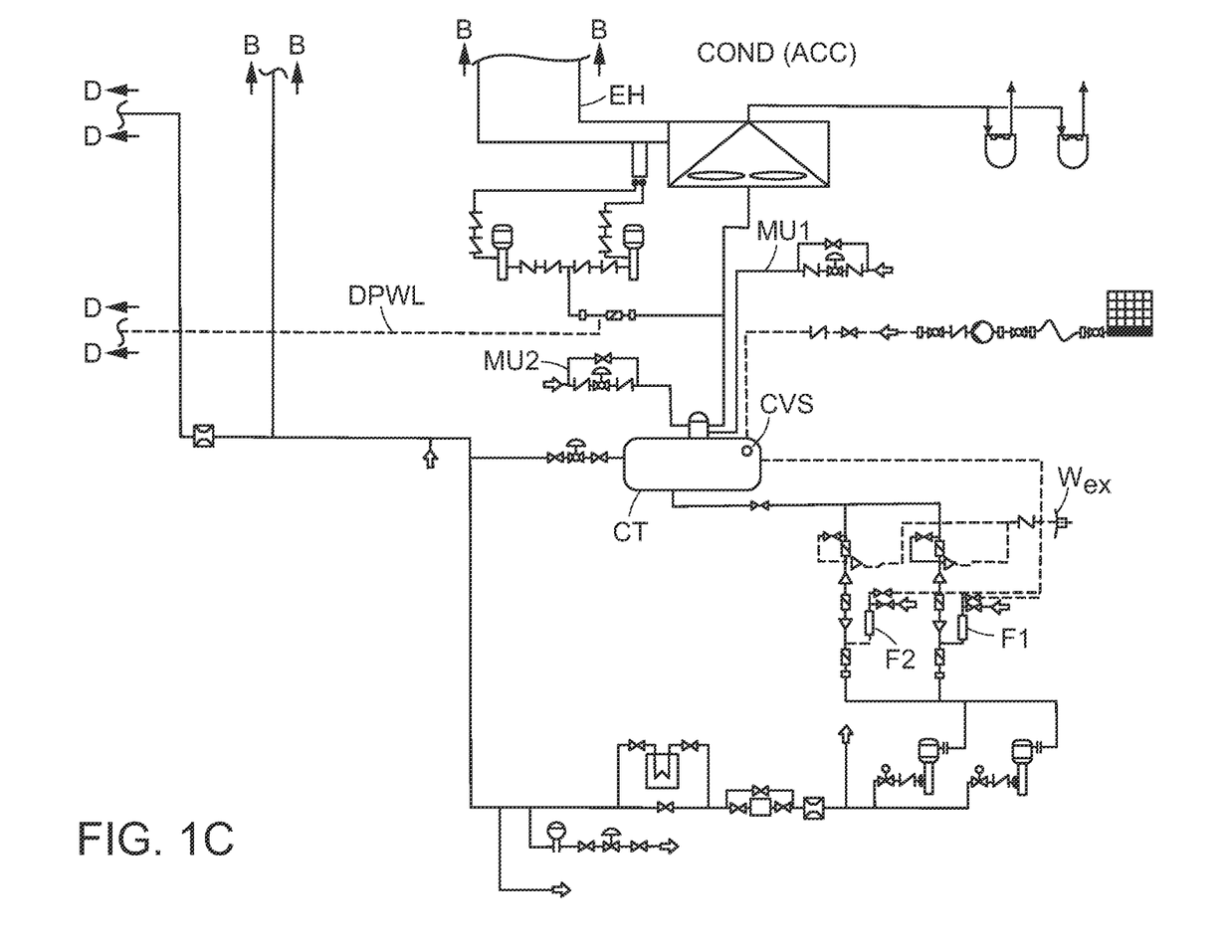

Additionally:

(c) Unlike prior art approaches, steam is conveyed from the HP steam (HPS) to the cold reheat through a temporary piping jumper (J1; FIGS. 1, 1B) (not through the permanent HP Turbine bypass valve). In state of the art processes the utilization of the permanent bypass line leaves a significant portion of the piping in the system untouched by the steam flows during the steamblow. The present approach assures full benefit of the steam to all piping portions.

(d) If the permanent Hot Reheat (HRH) and LP bypass pipes are used to convey steam to the condenser this would leave common HRH and LP piping without steam flow during the steamblow on plants with multiple units i.e., 2×1, 3×1 or 4×1 configurations. In these configurations, separate bypass valves are provided for each unit. To account for this situation, one can hydrolaze the HRH and LP common header in multi-unit configurations.

(e) Temporary piping from the LP steam and HRH steam are initially routed to the atmosphere from the piping in the vicinity of the steam turbine as indicated at W/S (FIGS. 1, 1B). This piping is used to initially vent steam to the atmosphere during startup as trash blows are performed to vent steam to the atmosphere prior to condenser operation to grossly clean the system. This flow path can also be used to target and "proof" cleanliness of the common HRH and LP steam headers, if required.

The atmospheric vent piping also contains pneumatically controlled gate valves for the HRH and LP temporary vent lines. As in the '566 Bloch patent's system, flow to the atmosphere is controlled with these valves. To transition from atmosphere to the condenser, the waste-to-atmosphere valves are slowly closed while the condenser valve is simultaneously slowly opened.

(g) The gate valves are constructed/configured to fail in an open to the atmosphere mode and are closed to the condenser in the event of an emergency. This failure mode can be initiated by an e-stop button or will occur automatically with loss of power (black plant condition).

(h) The LP steam bypass is modified in the same way as HRH steam bypass to convey LP steam to the condenser. See J2 (FIGS. 1, 1B). The beginnings and ends of J1 and J2 terminate in running tee sections, through the J2 termination of the running tee can omit a tee section.

For surface condenser plants, condenser tube protection is preferably provided in the Bloch '566 patent, by an internal shield within the condenser upstream of the coolant tubes in the steam flow. This is usually necessary for an air cooled condenser A second aspect of the present invention is the modification of the quench system, to reduce steam temperatures to within the material limits of the temporary piping and valves, which are normally less than those of the permanent piping system components; in order to reduce steam enthalpy to within the limits of the condenser; to control sound pressure levels when the steam exits to the atmosphere; and to allow thermo-cycling of the downstream piping systems.

First, the HP steam temperature must be reduced to match the temperature of the cold reheat steam (CRHS) system, since steam is conveyed from the HP steam system to cold reheat via a temporary piping system. Methods for achieving this temperature change can include the following:

a permanently installed desuperheater at the outlet of the HP superheater. On some plants, this desuperheater has the capacity to reduce the HP steam temperature to within the temperature limit of the cold reheat steam system. In this case, no action is required;

in case of a permanently installed desuperheater at the outlet of the HP superheater which is not capable of desuperheating to CRH temperature, one can make temporary modifications to this system to increase its capacity to what is required. For example, the desuperheater nozzle can be replaced with a higher capacity nozzle and/or the temperature control valve (TCV) can have its trim cage replaced with one capable of higher flow rates;

in case of a plant having no HP afterstage desuperheater, a temporary desuperheater can be installed in the line. This desuperheater is installed upstream of the branch connection to the HP bypass valve. The water supply for this quench point can be tied into the spray water supply line for the HP bypass valve. This configuration allows the desuperheater spray to be controlled from a control room manually or with automation or with automation bypassing the control room.

Vx and Vy shown in FIG. 1B outside the commissioning construct indicate the permanent plant Hot Reheat and LP steam bypass valves to be installed (or re-installed) after steam blow commissioning is completed.

The dashed line portions in FIGS. 1A, 1B, 1C and 1D indicate temporary piping (and included equipment items therein) that are used for commissioning but usually removed after commissioning is completed though some of such piping/equipment can remain in special instances.

In all of the above cases, the desuperheater can be used to thermocycle the HP pipe, Cold Reheat steam (CRHS) pipe, and the inlet of the reheater in the HT RCV. Steam temperature is measured using permanently installed thermocouples which are read via the controls in a control room.

Second, the HRHS steam temperature is reduced to protect the temporary piping components and to achieve the correct enthalpy for steam admission to the condenser. A new configuration is made using parts of permanent plant piping/equipment and parts of temporary piping/equipment, in which the first set of quench points Qii, Q2i are located in the HRH steam piping upstream of the HRH bypass branch. These quench points will reduce the steam temperature to within the limits of the carbon steel temporary pipe, and also to within the temperature limits of the carbon steel gate valves. It is important that the temperature remain above saturation in this area to avoid flooding the steam piping. The second set of quench points Q3i and Q4i is in the HRH bypass dumps piping in the temporary section downstream of the gate valve and proofing target insertion point. These quench points fed via pipes Q3, Q4 reduce the temperature of the steam to within the limits of enthalpy required for steam admission to the condenser. The condenser has both upper and lower limits for enthalpy, and on surface condensers it is not acceptable to send saturated steam to the condenser. The water supply for quench lines QI, Q2, Q3, and Q4 comes from a temporary common header (Q-HDR). In normal operation, this header is fed from the permanent HRH bypass valve desuperheater spray watersupply. In this way, the spray water can be modulated using the permanently installed temperature control valve (TCV) from a control room. The quench process can also be automated by a computerized control system, if desired. Manually or automatically adjusted valves in the lines to QI, Q2, Q3, and Q4 can be used to balance the flows among their respective quenching points.

Figure 1D:
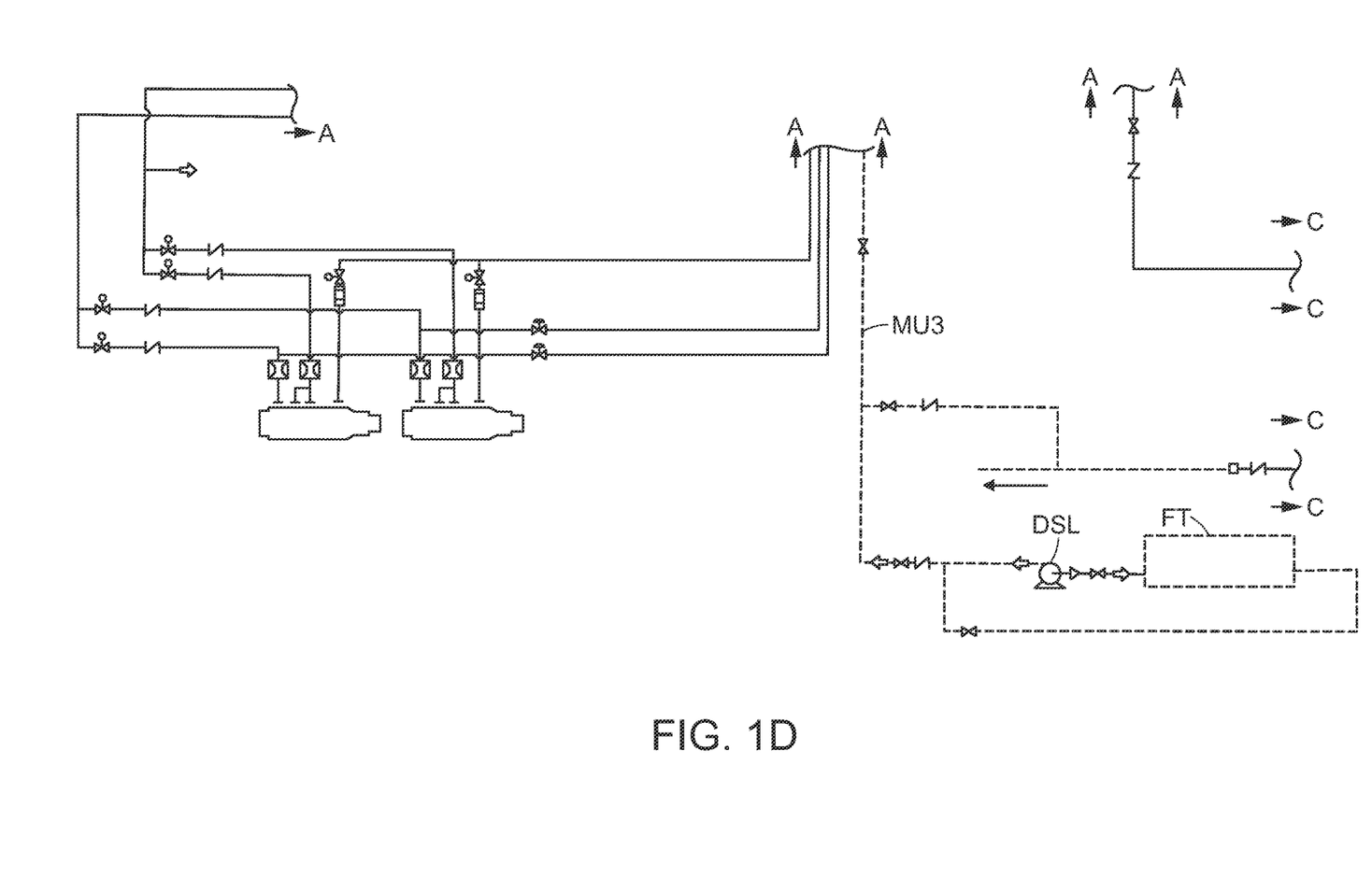

A further supply of quench water to the header, shown at FIGS. 1, 1D, is fed by a high pressure diesel pump DSL (FIGS. 1, 1D) which draws from temporary and/or permanent demineralized make up (MU) water tanks, e.g. a 20,000 gallon frac tank FT. The pump operates continuously through a minimum flow circuit, and can provide an immediate backup quench supply via line MU3 in the event of power failure. Additional water is provided from tanks (not shown) providing demineralized water as indicated at MU1 (for continuous base line flow and MU2 (for intermittent flow on demand). The diesel powered backup quench system may not always be required for every job. An outlet to waste W/S is provided via a valve (not shown).

During commissioning operation, steam temperature is measured using permanently installed temperature elements which display temperature information in a control room. This is done as follows: the LP steam to the condenser must be desuperheated to within condenser enthalpy limits. In the new configuration, this quench is accomplished via a temporary desuperheater in the LP bypass, in the temporary piping downstream of the gate valve Vx, Vy, and target point. LP steam temperature is typically low enough that desuperheating upstream of the temporary piping is not necessary. The source of quench water comes from the permanent LP bypass spray supply line. A temporary pipe connects the temporary desuperheater to this supply. Because the total enthalpy of the LP steam system is small, backup quench is not necessary for this line. The further quench requirement is for sound pressure reduction at the atmospheric vent. For cases where a kinematic silencer is used, quench point Q-5i is not required at all, since the silencer will control sound pressure levels. For open "Muzzlers," and open pipe ends, a quench point Q5i can be installed to provide additional quench to the atmospheric vent. This quench point can be fed from the plant's service water or fire suppression water system. Control of this quench point would be manual from the field during periods of atmospheric venting.

It is the industry standard during a steamblow to prove the cleanliness of the system by inserting a mirror finished metallic test coupon ("proofing target") into the steam flow while adequate cleaning conditions exist in the system being cleaned. Adequate cleaning conditions are normally defined as a factor of the mass velocity head at the Maximum Continuous Rating (MCR) condition. This factor is normally referred to as the "Disturbance Factor" or "Cleaning Force Ratio." According to the present invention's improved method of steamblow, pneumatic target inserters are used to insert the test coupon targets into the steam flow. After a fixed duration, usually fifteen minutes, the target is withdrawn and inspected. The condition of the target is compared against criteria provided by the steam turbine manufacturer. If the condition of the target is acceptable then the steamblow for that section is deemed complete.

For the present invention's improved method of steamblow, the target locations can be in the following points: (a) in the HRH bypass temporary piping spool; (b) downstream of the gate valve Vx, Vy, but upstream of the quench point; (c) in the LP bypass temporary piping spool, downstream of the gate valve but upstream of the quench point. For multiple unit plants, a proofing target may be installed in the HRH steam atmospheric vent piping as close as possible to the connection to the permanent piping. The purpose of this target point will be to "proof" the cleanliness of the HRH steam going to a common header (which will have been previously cleaned by the hydrolazing method). For multiple unit plants, a proofing target may be installed in the LP steam atmospheric vent piping as close as possible to the connection to the permanent piping. The purpose of this target point will be to "proof" the cleanliness of the LP steam common header (which will have been previously cleaned by the hydrolazing method).

Figure 2:
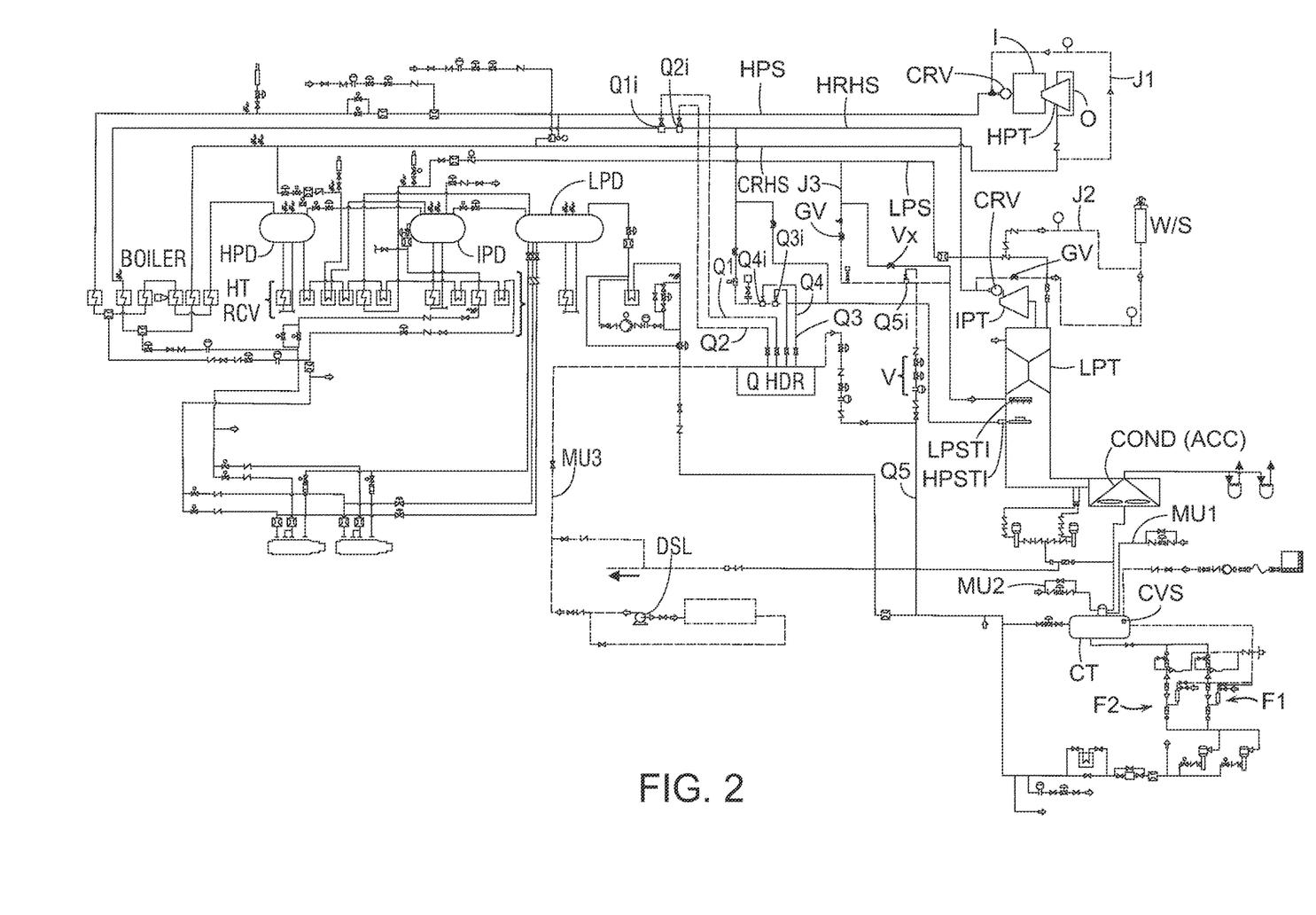

FIG. 2 with parts expanded in FIGS. 2A-2D (components of the FIG. 2 schematic) show schematically a second preferred embodiment of the present invention. The steam plant to be commissioned itself can operate stand-alone or as a heat recovery supplementary portion of a combined power cycle with one or more primary power cycles based on other sources of energy, (e.g. combustion gas, solar, geothermal or otherwise). In a combined cycle, the steam cycle "boiler" may be a heat recovery steam generator (HT RCV) reheating condensate to steam from primary cycle residual energy use of one of the above energy sources. Steam is admitted to the turbine T to drive a load (e.g. an electricity generator). Exhaust steam from the turbine is admitted to a condenser COND, which may be of "surface cooled" form, i.e. with steam cooled on surfaces of pipes therein LCP with circulation of liquid coolant therein or of air cooled condenser (ACC) types. The condenser has a condenser vapor space CVS therein (or in an adjunct condensate tank) and a hotwell HW therein containing liquid condensate that is recirculated to the boiler (HRSG or otherwise) via one or more condensate pumps CP of permanent plant equipment. In many steam plant systems there is a need for commissioning for initial startups of plants or later startups after offline repairs deal with major particulate and nonparticulate contamination of plant piping and equipment introduction in original manufacturing or refurbishing of the plant.

Figure 2A:
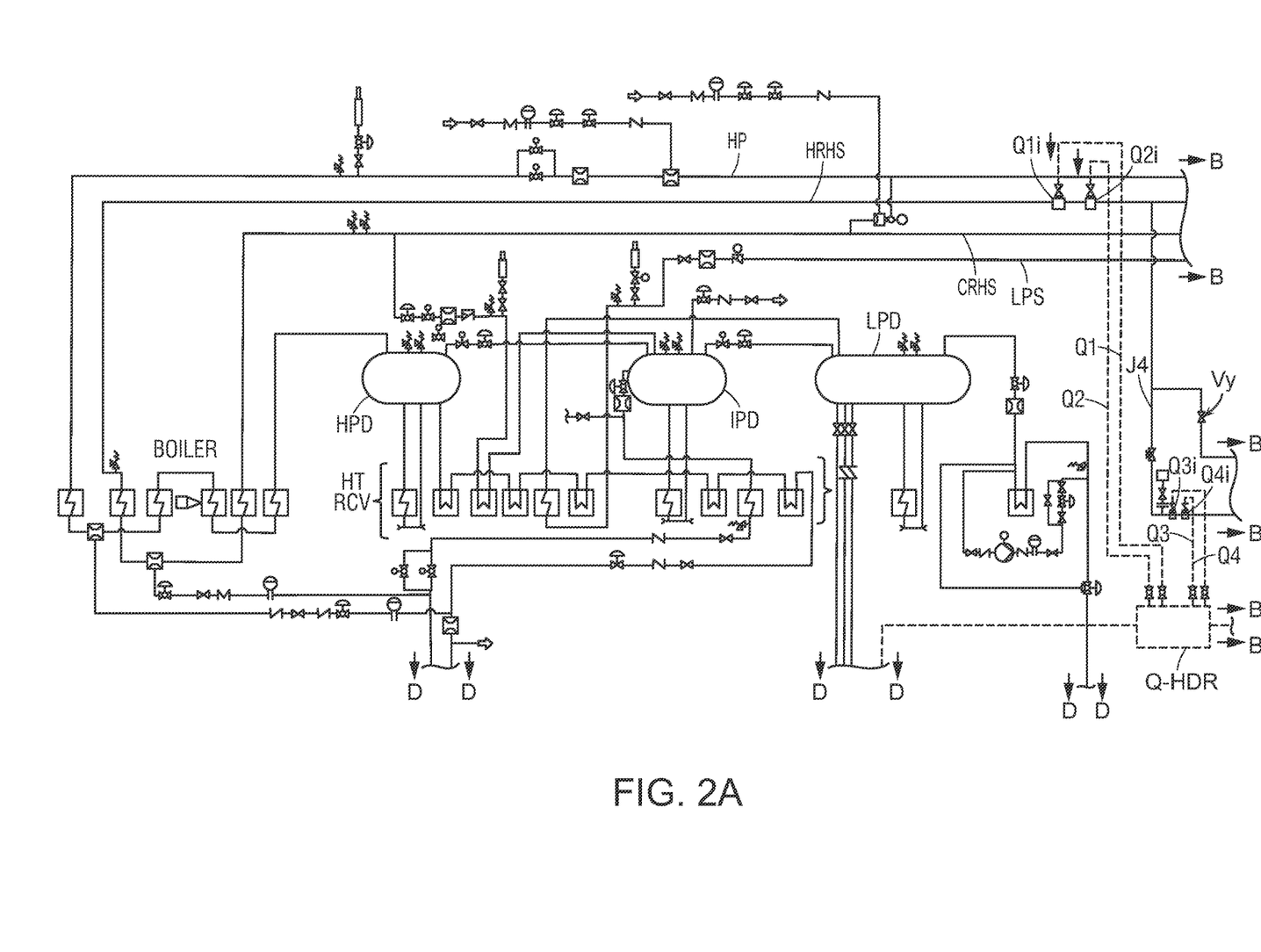
FIGS. 2A, 2B, 2C, and 2D show portions thereof in higher scale for ease of viewing and explanation. Connecting points of the FIGS. 2A, 2B, 2C and 2D are indicated by arrows A-A at breaks of other FIGS. connecting to FIG. 2A, B-B at breaks of other FIGS. connecting to FIG. 2B, C-C, at breaks of other FIGS connecting to FIG. 2C, and D-D at breaks of other FIGS connecting to FIG. 2D.
Figure 2B:
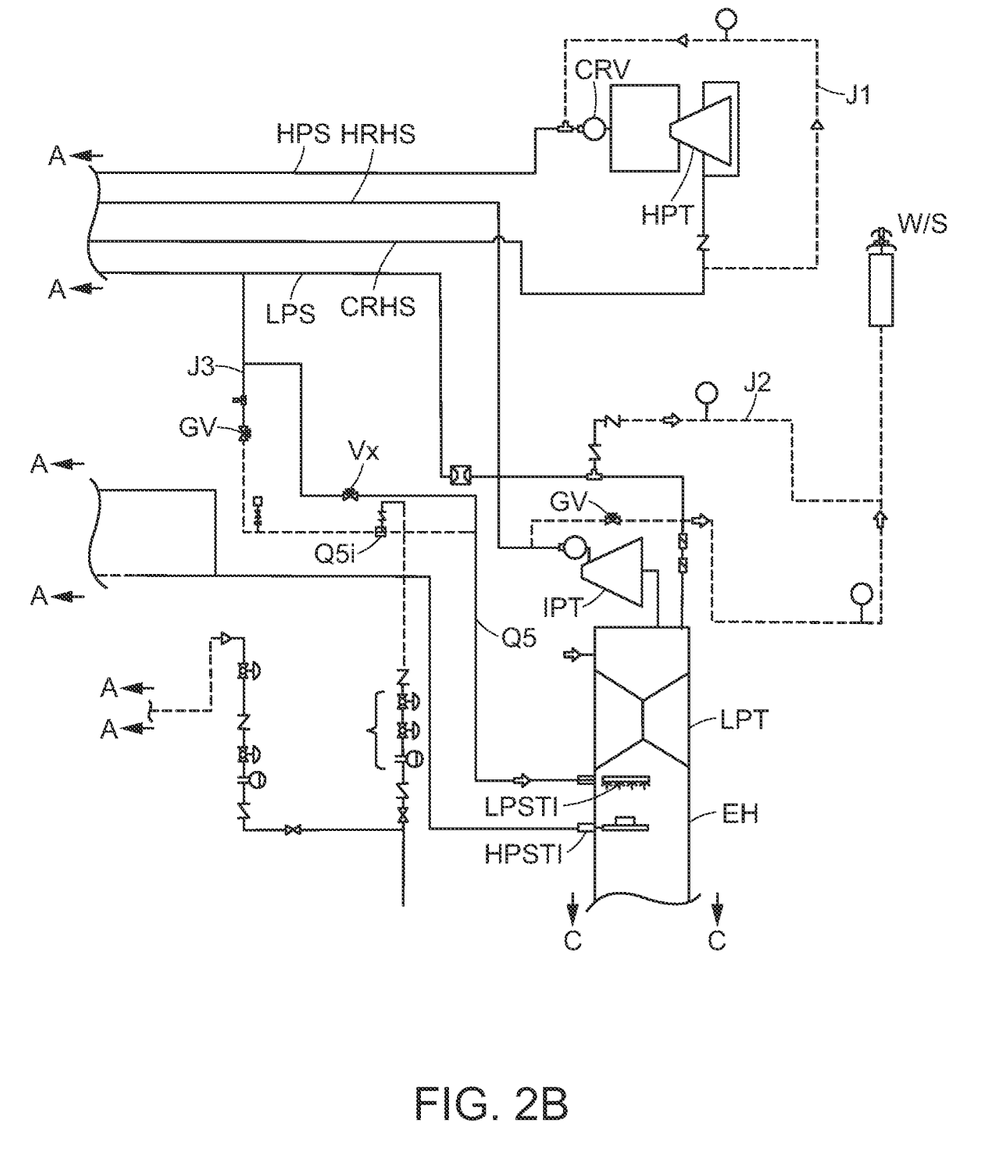
Figure 2C:
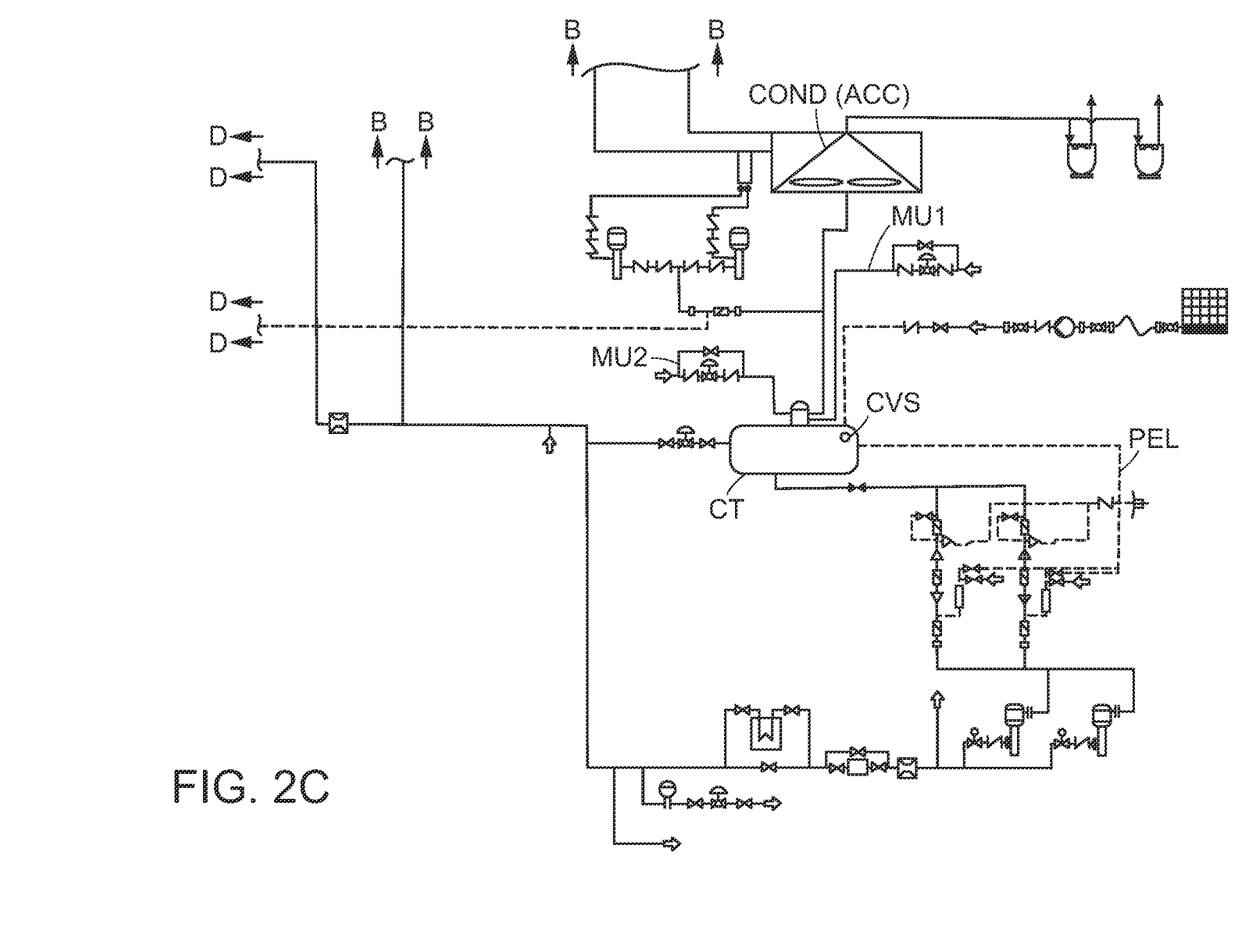

In FIGS. 2, 2A, 2B, 2C, 2D the steam plant, as a whole, is shown, as an exemplary embodiment, as including a primary plant boiler section fired (heated) with fossil fuels, biomass, nuclear energy with heat exchangers, heat recovery stack labeled (HT RCV) with further hear exchangers connected to a high pressure (HP) steam drum (HPD), an intermediate pressure (IP) steam drum (IPD) and low pressure (LP) steam drum (LPD) steam lines are provided for high pressure steam (HPS), hot reheat steam (HRHS), low pressure steam (LPS) and cold reheat steam (CRHS) as shown in FIGS. 2, 2A, 2B these lines are serviced by a quenching water header (Q-HDR) with outlet lines Q1, Q2, Q3, Q4 leading to quench injection points Q1i, Q2i, Q3i and Q4i at the above cited steam lines as shown in FIGS. 2, 2A, 2B. The steam powered engines of the plant comprise a high pressure turbine (HPT), with dual steam inlet lines I and dual outlet lines O and with a lead-in control valve CRV, an intermediate pressure turbine (IPT) with a lead-in control valve CRV and a low pressure turbine (LPT), the latter with an exhaust hood (EH) including a intermediate pressure steam sparge tube injector (IPSTI) and low pressure steam sparge tube injector (LPSTI), leading up to an air cooled condenser (ACC) shown in FIGS. 2, 2C. The condenser has a main exhaust leading to a condensate tank CT with a condensate vapor space (CVS) therein. Vacuum pumps to establish low base pressure in the condenser, inlet feed and MU1 and MU2 for make-up water to the tank (MU1 continuously and MU2 intermittently on demand) and an exhaust to waste Wex engaged if and as needed and an outlet line Q5 for providing quenching water under valve(s) V control at location Q5i of a temporary line Q5.

Previous versions of the SIGMABLOW™ steamblow system described in the '566 patent utilized a number temporary pipe lines and associated valving with some parts rated for high temperatures and pressures to convey steam to the condenser bypassing portions of the permanent plant piping and valves. The resultant sustained high volume flow in the temporary piping and size and expense of such temporary piping installation can be reduced by making greater use of permanent piping of the steam plant. This is done in part in the above first embodiment of FIGS. 1 and 1A-1D and to a greater beneficial extent in this second embodiment of FIGS. 2 and 2A-2D. Each of these changes involves full consideration of safety as well as direct and indirect economic benefits.

As noted above in discussion of the FIG. 1 embodiment, prior art, such as the Siemens ABO process, and some processes of General Electric Co. use the permanent bypass line to convey steam to the condenser. The limitation of these processes is that they leave the permanent bypass valve installed, with a sacrificial trim kit installed. The bypass valve body and trim kit create a significant flow restriction, which creates backpressure on the steam systems during the steamblow process. The effect of this increased pressure is to reduce steam velocities in the systems being cleaned, which results in a longer blow duration and lower quality cleaning of the systems. To compensate for the limited effectiveness of the steamblow in these methods, the methods may require a substantial amount of expensive chemical cleaning, high velocity water flushes, and/or complete hydrolazing of the associated steam piping systems. In the present invention chemical injection can be omitted or applied in reduced form for reacting with non-particulate contamination during commissioning.

In order to take further advantage of portions of the existing bypass piping beyond the scope of the above FIGS. 1 (and 1A-1D) without the above limitations, the present invention uses the existing bypass piping, with less temporary modification.

(a) The permanent HRH steam and LP steam bypass valves can be installed before the steam plant commissioning, in contrast to removal of permanent piping and bypass valves or deferral of installation of such parts, as in the above embodiment of FIGS. 1 and 1A-1D. Bypass piping or jumpers and related valving are provided around bypass valves reducing time and cost of set-up and of removal after commissioning.

(b) If necessary, the plant's permanent bypass diffusers, if any, are modified to facilitate the steamblow process. This becomes a factor in cases where the design of the diffuser(s) is not suitable to handle particulate contamination, for example diffusers with very small holes or a stacked plate style diffusers. See, the '566 Bloch patent for showing of diffusers, generally, per se, or combined with managing flow of turbine exhaust steam to the condenser, often via a cyclone separator. In many instances of use of the invention in commissioning projects the diffuser and/or cyclone separators (or the like) components can be eliminated with significant savings of costs and of time to set up and take down temporary commissioning components.

The flow area of an open full port gate is much greater than the equivalent flow area through the permanent bypass valve trim that is temporarily replaced by the gate valve for commissioning. This is because the permanent bypass valve is designed for flow control with a high differential pressure. In the HRH system this means reducing pressure from calibrated base pressure, e.g. 600 psi, to whatever the pressure upstream of the diffuser is, which is typically around 100 psi at load, i.e. a 6 to 1 pressure drop ratio. So the valve is designed to reduce pressure by about 500 psi in a controlled fashion without acoustic vibration issues. The steamblow for commissioning requires flow control with minimum pressure drop, since the goal is to minimize backpressure on the system being cleaned. A gate valve or the like is provided with temporary jumper loop for this purpose.

Because the steamblow can be performed with a low back pressure, it is possible to achieve extremely aggressive cleaning conditions in the boiler and piping systems. This means that customary-to-prior-art steps of hydrolazing, water flushing, and extensive chemical cleaning of the systems are not necessary or even beneficial in many instances, though hydrolyzing may be used for sections of the plant that are not cleaned by the steamblow process, such as HRH and LP common headers downstream of the bypass valve branch connections. This makes this approach significantly faster and more economical than prior art technologies.

Additionally:

(c) Steam is conveyed from the HP steam (HPS) to the cold reheat through a temporary piping jumper (J1; FIGS. 2, 2B) (not through the bypass valve). In state of the art processes the utilization of the permanent bypass line leaves a significant portion of the piping in the system untouched by the steam flows during the steamblow. The present approach assures full benefit of the steam to all piping portions.

(d) If a permanent bypass pipe is used to convey steam to the condenser this would leave common HRH piping without steam flow during the steamblow on plants with multiple units i.e., 2×1, 3×1 or 4×1 configurations. In these configurations, separate bypass valves are provided for each unit. To account for this situation, one can hydrolaze the HRH common header in multi-unit configurations.

(e) As in the prior FIG. 1 (and FIGS. 1A-1D) embodiment, this embodiment of FIGS. 2 and 2A-2D provides temporary piping from the LP steam and HRH steam are initially routed to the atmosphere from the piping in the vicinity of the steam turbine as indicated at W/S (FIGS. 2, 2B), but to a lesser extent than in the FIG. 1 embodiment and using more of the permanent piping, i.e., essentially as "jumpers" around the permanent plant bypass valve discussed above. This piping is used to initially vent steam to the atmosphere during startup as trash blows are performed to vent steam to the atmosphere prior to condenser operation to grossly clean the system. This flow path can also be used to target and "proof" cleanliness of the common HRH and LP steam headers.

(f) The atmospheric vent piping also contains pneumatically controlled gate valves. As in the '566 Bloch patent's system, flow to the atmosphere is controlled with these valves. To transition from atmosphere to the condenser, the waste-to-atmosphere valve is slowly closed while the condenser valve is simultaneously slowly opened.

(g) The gate valves are constructed/configured to fail in an open to the atmosphere mode and are closed to the condenser in the event of an emergency. This failure mode can be initiated by an e-stop button or will occur automatically with loss of power (black plant condition).

(h) The LP steam bypass is modified in the same way as HRH steam bypass to convey LP steam to the condenser. See J2 (FIGS. 2, 2B).

(i) The beginnings of J1 and J2 turn corners not with conventional elbow joints but with running tee connections (TEE) replacing permanent plant elbows for commissioning and closed and sealed with weld caps after commissioning is done. Looking further at FIGS. 2, 2A and 2B it is seen that elbows (typically 90D types) are replaced by temporary full tee connections (each having running length and an angled [typically 90°] tee branch leg) with steam passing LPS and HRs linear to LPST1 and HPST1 distributors, respectively, in both cases bypassing permanent plant bypass valves. Then arrangements, in combination with cooling water injection of points temporary injectors (desuperheaters) $Q1_i$ and $Q2_i$ (located in the permanent HRH piping upstream of the bypass branch connection) and temporary injectors (desuperheaters) $Q3_i$ and $Q4_i$ in the parts leading from the CRHS line to HPSTI. The jumper dumping into the HRH bypass condenser dump, downstream of the HRH bypass valve. Q5 is located in the LP bypass valve bypass jumper, and injects cooling water downstream of the LP bypass valve in the LP bypass condenser dump line.

When steam flows through a tee, particulate contamination will follow the run of the tee and will not usually go through the branch. This is because of centrifugal force on the particles, and is similar to the action of a cyclone separator. When building a jumper around the bypass valves, the tee run goes to the temporary jumper, and the tee branch leg feeds the inlet of the permanent bypass valve. This will prevent contamination of the piping upstream of the permanent bypass valve during the steamblow, and will also prevent ballistic impingement of particles into the bypass valve. Whether replacing the permanent bypass valve or building a jumper around it, the temporary valves in the jumper can be rated for the permanent system relief valve pressure at steamblow design temperature. Steamblow design temperature at the bypass valve is lower than the normal operating temperature because of the temporary desuperheaters (quenching injection points) installed in the steam headers upstream of the bypass valves.

For the atmospheric vent piping, there are temporary connects to the HRH and LP steam headers near the steam turbine. At each connection point there is a temporary valve rated for permanent relief valve pressure at (reduced) design temperature. The above valve ratings allow complete elimination of the need for temporary pressure safety valves in the jumper loops since one can rely on permanent PSVs. This further reduces pipe quantities. Additionally, the atmospheric vent piping no longer needs to be designed as pressure safety valve vent piping (which is subject to specific requirements by the ASME codes) which means the vent piping can be smaller in diameter. On projects where noise is not an issue, muzzlers can be completely eliminated.

(j) For surface condenser plants, condenser tube protection is preferably provided in the Bloch '566 patent, by an internal shield within the condenser upstream of the coolant tubes in the steam flow. This is usually not necessary for an air cooled condenser through it may be used in some instances.

As noted above, a quench system is provided to reduce steam temperatures to within the material limits of the temporary piping and valves, which are normally less than those of the permanent piping system components pressure is inherently reduced as well. This is done in order to reduce steam enthalpy to within the limits of the condenser; to control sound pressure levels when the steam exits to the atmosphere and to allow thermo-cycling of the downstream piping systems.

First, the HP steam temperature must be reduced to match the temperature of the cold reheat steam (CRHS) system, since steam is conveyed from the HP steam system to cold reheat via a temporary piping system. Methods for achieving this temperature change can include the following:

a permanently installed desuperheater at the outlet of the HP superheater. On some plants, this desuperheater has the capacity to reduce the HP steam temperature to within the temperature limit of the cold reheat steam system. In this case, no action is required;

in case of a permanently installed desuperheater at the outlet of the HP superheater which is not capable of desuperheating to CRH temperature, one can make temporary modifications to this system to increase its capacity to what is required. For example, the desuperheater nozzle can be replaced with a higher capacity nozzle and/or the temperature control valve can have its trim cage replaced with one capable of higher flow rates;

in case of a plant having no HP afterstage desuperheater, a temporary desuperheater can be installed in the line. This desuperheater is installed upstream of the branch connection to the HP bypass valve. The water supply for this quench point can be tied into the spray water supply line for the HP bypass valve. This configuration allows the desuperheater spray to be controlled from a control room manually or with automation or with automation bypassing the control room.

Vx and Vy shown in FIGS. 2A and 2B in Jumper Loops J3 and J4 outside the commissioning construct indicate the permanent plant hot reheat and LP steam bypass valves are to be installed (or re-installed) after steam blow commissioning is completed. In this embodiment, the HRH and LP bypass valves are installed and a jumper is built around them. After commissioning these jumpers are removed and the open running tee ends of tee joints no longer in a flow path are closed and sealed with weld caps.

The dashed line portions in FIGS. 2A, 2B, 2C and 2D indicate temporary piping (and included equipment items therein) that are used for commissioning but usually removed after commissioning is completed though some of such piping/equipment can remain in special instances.

In all of the above cases, the desuperheater can be used to thermocycle the HP pipe, cold reheat steam pipe, and the inlet of the reheater. Steam temperature is measured using permanently installed thermocouples which are read via the controls in a control room.

Second, the HRH steam temperature is reduced to protect the temporary piping components and to achieve the correct enthalpy for steam admission to the condenser. A new configuration is made using parts of permanent plant piping/equipment and parts of temporary piping/equipment, in which the first set of quench points Q1i, Q2i are located in the HRH steam piping upstream of the HRH bypass branch (temporary lines Q1 and Q2 in FIGS. 2, 2A). These quench points will reduce the steam temperature to within the limits of the carbon steel temporary pipe, and also to within the temperature limits of the gate valves. It is important that the temperature remain above saturation in this area to avoid flooding the steam piping. The second set of quench points Q3 and Q4 is in the HRH bypass dumps piping in the temporary section downstream of the gate valve and proofing target T (see below) insertion point. These quench points fed va pipes Q3, Q4 reduce the temperature of the steam to within the limits of enthalpy required for steam admission to the condenser. The condenser has both upper and lower limits for enthalpy, and on surface condensers it is not acceptable to send saturated steam to the condenser. The water supply for quench lines Q1, Q2, Q3, and Q4 comes from a temporary common header (Q-HDR). In normal operation, this header is fed from the permanent HRH bypass valve desuperheater spray water supply. In this way, the spray water can be modulated using the permanently installed temperature control valve (TCV) from a control room. The quench process can also be automated by a computerized control system, if desired. Manually or automatically adjusted valves in the lines to Q1, Q2, Q3, and Q4 can be used to balance the flows among their respective quenching points.

Figure 2D:
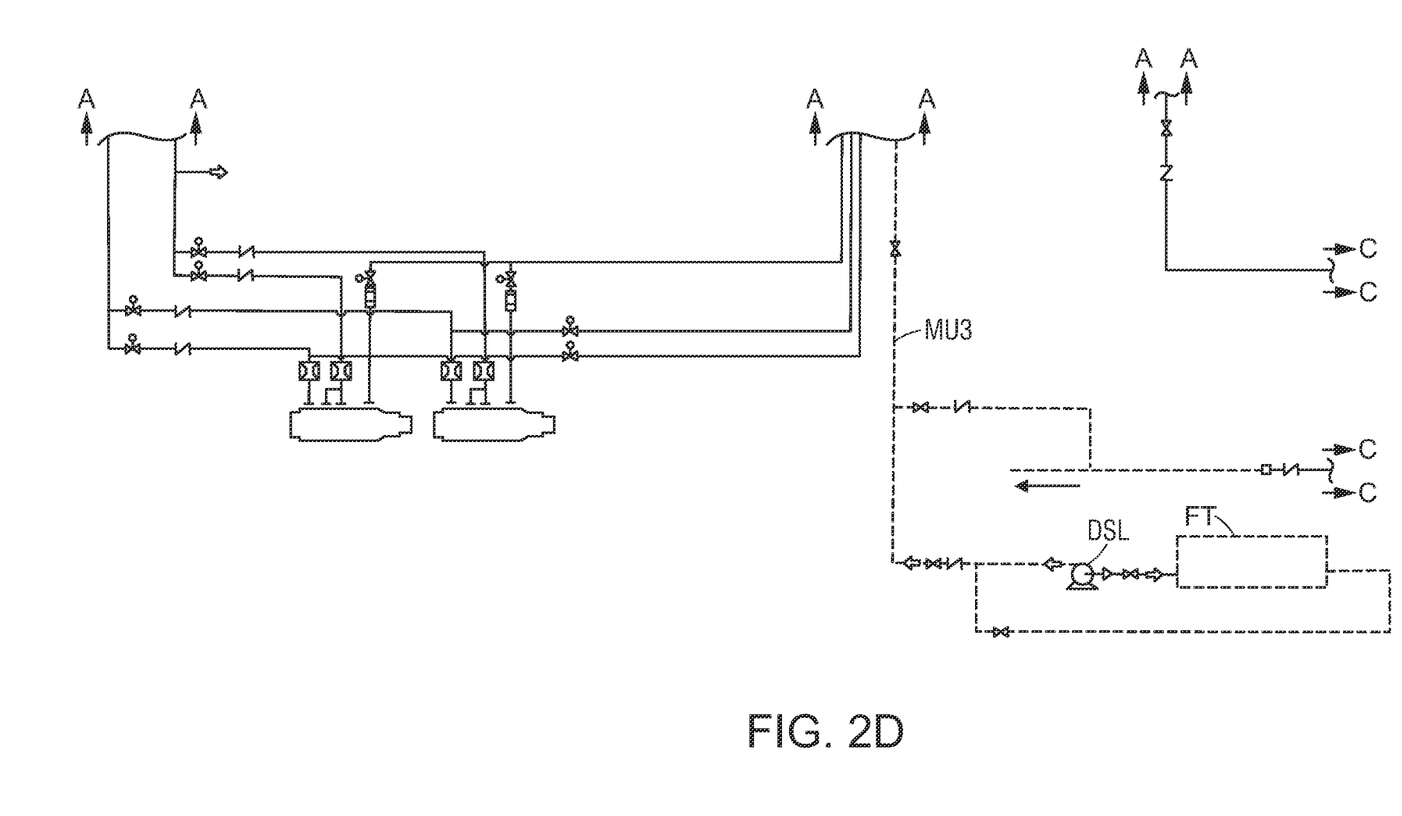

A further supply of quench water to the header, shown at FIGS. 2, 2D, is fed by a high pressure diesel pump DSL (FIGS. 2, 2D) which draws from temporary and/or permanent demineralized make up (MU) water tanks, e.g. a 20,000 gallon frac tank FT. The pump operates continuously through a minimum flow circuit, and can provide an immediate backup quench supply via lines MU3 in the event of power failure. Additional water is provided from tanks (not shown) providing demineralized water as indicated at MU1 (for continuous base line flow and MU2 (for intermittent flow on demand). The backup diesel engine pumped quench system may not be required on all projects.

During commissioning operation, steam temperature is measured using permanently installed temperature elements which display temperature information in a control room.

This is done as follows: the LP steam to the condenser must be desuperheated to within condenser enthalpy limits. In the new configuration, this quench is accomplished via a temporary desuperheater in the LP bypass, in the temporary piping downstream of the gate valve and target point. LP steam temperature is typically low enough that desuperheating upstream of the temporary piping is not necessary. The source of quench water comes from the permanent LP bypass spray supply line. A temporary pipe connects the temporary desuperheater to this supply. Because the total enthalpy of the LP steam system is small, backup quench is not necessary for this line. The further quench requirement is for sound pressure reduction at the atmospheric vent. For cases where a kinematic silencer is used, quench point Q5i is not required at all, since the silencer will control sound pressure levels. For open "Muzzlers," a quench point Q-5i can be installed to provide additional quench to the atmospheric vent. This quench point can be fed from the plant's service water or fire suppression water system. Control of this quench point would be manual from the field during periods of atmospheric venting.

As noted above, It is the industry standard during a steamblow to prove the cleanliness of the system by inserting a mirror finished metallic test coupon ("proofing target") into the steam flow while adequate cleaning conditions exist in the system being cleaned. Adequate cleaning conditions are normally defined as a factor of the mass velocity head at the Maximum Continuous Rating (MCR) condition. This factor is normally referred to as the "Disturbance Factor" or "Cleaning Force Ratio." According to the present invention's improved method of steamblow, pneumatic target inserters are used to insert the test coupon targets into the steam flow. After a fixed duration, usually fifteen minutes, the target is withdrawn and inspected. The condition of the target is compared against criteria provided by the steam turbine manufacturer. If the condition of the target is acceptable then the steamblow for that section is deemed complete.

For the present invention's improved method of steamblow, the target locations can be in the following points: (a) in the HRH bypass temporary piping spool; (b) downstream of the gate valve GV but upstream of the quench point; (c) in the LP bypass temporary piping spool, downstream of the gate valve but upstream of the quench point. For multiple unit plants, a proofing target may be installed in the HRHS steam atmospheric vent piping as close as possible to the connection to the permanent piping. The purpose of this target point will be to "proof" the cleanliness of the HRH steam going to a common header (which will have been previously cleaned by the hydrolazing method). For multiple unit plants, a proofing target may be installed in the LP steam atmospheric vent piping as close as possible to the connection to the permanent piping. The purpose of this target point will be to "proof" the cleanliness of the LP steam common header (which will have been previously cleaned by the hydrolazing method).

In all three of the above embodiments and other embodiments within the over-arching scope of the present invention, there are various common features of the closed cycle steam plant, such as:

(a) The dual filter assembly shown as F1, F2 with a pressure equalization line PEL connected to condenser vapor space CVS, with sequential backflush clearance of mesh filter screens in one or the other alternately, operating with high pressure air from a common air tank (not shown), all as described more fully in PCT Application No. PCT/US I 7/68942 filed Dec. 29, 2017 with expected publication on or about Jun. 29, 2018, the content of said application, and corresponding embodiments in public use being incorporated herein in their entirety by reference as though set out at length herein; and (b) Piping sections which are not cleaned by steamblowing in this process are hydrolazed. These sections include the HRH and LP common headers downstream of the bypass valve branch connections, and other sections which may not be feasible to steam clean (this limited hydrolazing being a small usage compared to use of hydrolazing of a full steam circuit as a commissioning process per se that preceded usage of the '566 patent system).

The present invention as a whole makes it feasible to reduce commissioning costs by reduction of numbers and length of temporary piping for substantive rarings of piping costs, welding costs, installation-deinstallation time and related costs, lower cost of carbon steel piping vs. previously needed expensive alloy steel piping. The range of usage of steam plant commissioning of the '566 patent's new benefit, is thus greatly expanded.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. A commissioning process for a steam cycle power plant, the process comprising:
   providing temporary valving and piping to a condenser of a steam cycle power plant;
   injecting quenching fluid in piping leading to temporary valves,
   wherein the injecting of quenching fluid is configured to reduce steam pressure and temperature in the piping leading to the temporary valves, and
   wherein the reduced steam pressure and temperature in the piping leading to the temporary valves enables a pressure drop across the temporary valves of less than 5 psi;
   providing temporary conduction of steam via the temporary valving and piping, wherein the temporary conduction of steam bypasses one or more turbine stages and bypasses valving and bypass paths associated with the one or more turbine stages,
   wherein pressure drops in the temporary valving and piping are inherently lower than pressure drops in the valving and bypass paths associated with the one or more turbine stages;
   wherein the temporary valving and piping includes a temporary piping spool containing a gate valve and temporary desuperheating system for using in commissioning; and
   replacing the gate valve and temporary desuperheating system with permanent hot reheat and low pressure bypass valves and related spools after the commissioning.

2. The process of claim 1, wherein the commissioning process comprises a steamblow commissioning process.

3. The process of claim 2, wherein the steam cycle power plant comprises:
   a boiler;
   a turbine with multiple pressure stages;
   the condenser; and
   interconnection piping in a closed cycle.

4. The process of claim 3, comprising routing steam to the condenser as a steamblow for cleaning the interconnection piping and the condenser.

5. The process of claim 1, wherein the steam cycle power plant is part of a combined cycle plant.

6. The process of claim 5, wherein the combined steam cycle power plant comprises:
- a main cycle having an exhaust path steam power cycle of a boiler;
- a turbine with multiple stages from high to low pressure;
- a condenser; and
- exhaust means recycling to the boiler.

7. The process of claim 6, wherein the boiler comprises a heat recovery heat exchanger in the main-cycle exhaust path.

8. The process of claim 7, wherein the steam cycle power plant comprises multiple heat exchangers configured in sequence for heat recovery between successive turbine stages.

9. The process of claim 8, wherein the multiple heat exchangers comprise permanent plant pressure safety valves.

10. The process of claim 9, wherein, the routing to the condenser of the steam cycle power plant for commissioning includes jumper loop bypass conduits replacing or bypassing the permanent plant pressure safety valves and having low pressure drop valving therein.

* * * * *